United States Patent [19]

Duggins

[11] 4,086,774
[45] May 2, 1978

[54] DRIP IRRIGATION SYSTEM

[75] Inventor: Ray Brown Duggins, Chadds Ford, Pa.

[73] Assignee: E. I. Du Pont de Nemours and Company, Wilmington, Del.

[21] Appl. No.: 768,847

[22] Filed: Feb. 15, 1977

[51] Int. Cl.² .......................... E02B 13/00; F16D 1/00
[52] U.S. Cl. ..................................... 61/13; 137/513.3; 138/45; 239/145; 239/542
[58] Field of Search ................. 61/12, 13; 138/45, 40; 239/542, 145; 137/513.3

[56] References Cited

U.S. PATENT DOCUMENTS

| 3,837,363 | 9/1974 | Meronek | 138/45 |
| 3,912,165 | 10/1975 | Pira | 239/542 |
| 3,939,875 | 2/1976 | Osborn et al. | 61/12 |

Primary Examiner—Jacob Shapiro

[57] ABSTRACT

A drip irrigation system is disclosed wherein individual drip irrigation tubes are fed from a header by means of a flow controller which feeds water to the irrigation tube at an essentially uniform rate over a wide variety of pressures in the header. Generally the flow controller will be capable of maintaining the flow therethrough within ± 15% of a predetermined value within a pressure variation of from 3 to 60 psi.

3 Claims, 3 Drawing Figures

DRIP IRRIGATION SYSTEM

BACKGROUND OF THE INVENTION

The present invention relates generally to irrigation systems using drip irrigation tubes. The drip irrigation tubes can be set either on the surface or burried in the ground. Such drip irrigation tubes are disclosed in U.S. Pat. No. 3,830,067, and U.S. Pat. No. 3,698,195 and U.S. Application Ser. No. 488,827. In the past when installing such drip irrigation systems it has been necessary to use a valve which must be manually adjusted to provide the proper flow. Many drip irrigation tubes undergo a break in period after which their effective porosity changes and it is necessary to readjust the flow control valve.

SUMMARY OF THE INVENTION

The drip irrigation system of the present invention obviates the above disadvantage by providing a flow controller between the header and the individual drip irrigation tubes. The flow controller is a housing containing a deformable member which deforms increasingly in response to water pressure. The more the deformable member deforms the smaller the effective opening controlling the water flow becomes so that the gallons per minute of water received by the drip irrigation tube remains relatively constant.

BRIEF DESCRIPTION OF THE DRAWING

Referring now to FIG. 1 a flow controller indicated generally as 11 is attached to a header 12 and held in place by Mae West style sheet metal nut 13. A gasket 14 of a soft material such as cork or rubber is provided to minimize leakage of water. Flow controller 11 comprises flow control holder 15, flow control valve 16, orifice 17 and housing 18. Feeder tube 21 is inserted in housing 18 and frictionally held in place by constriction 22. Feeder tube 21 is connected to drip irrigation tube 23 by means of O-ring 24 and connector cone 25. A pressure release valve 26 is mounted on flow controller 11.

Referring now to FIG. 2 the pressure release valve 26 is shown mounted on a section of flow controller 11. The pressure release valve comprises a clip to hold it on the flow controller attached to a deformable member which is inserted in a hole in the wall of flow controller 11.

Referring now to FIG. 3 a plot of flow in gallons per minute vs. pressure is shown. The plot reports the values observed using a flow control valve 16 formed of a Buna N elastomer of 40 durometer, an external diameter of one-half inch, a thickness of 0.125 and a central orifice 0.067 inch in diameter. As can be seen from FIG. 2 the flow rate is relatively constant, i.e., within ± 15% of a predetermined value over a wide range of pressures, such as from 3 psi on up to well in excess of 70 psi. The flow rate reported in FIG. 2 varies from 0.30 to 0.38 gallons per minute which is well within ± 15% of a predetermined value of 0.34.

DETAILED DESCRIPTION

The use of flow controllers to control the flow of water to drip irrigation tubing offers many advantages. It has been found that drip irrigation tubing emits a more uniform amount of water along a given length thereof, if the pressure within the drip irrigation tube is maintained at a low value. It has been found that generally the drip irrigation tube should emit from 1.5 to 6 gallons per minute per thousand feet of drip irrigation tube and preferably the drip irrigation tube emits about 3.5-4 gallons per minute per thousand feet of drip irrigation tube. For drip irrigation tubing prepared from non-woven, spun bonded, plexifilamentary polyethylene fabric this latter emission value corresponds to about 5 psi water pressure in the drip irrigation tube. The water pressure in the header will generally be from 3 to 70 psi. The 3 psi represents the pressure drop usually experienced across flow controller valve while the 70 psi represents the limit at which the flow controller can be mounted on a flexible header without leakage or structural failure of the header with presently available fasteners.

Figure 1:
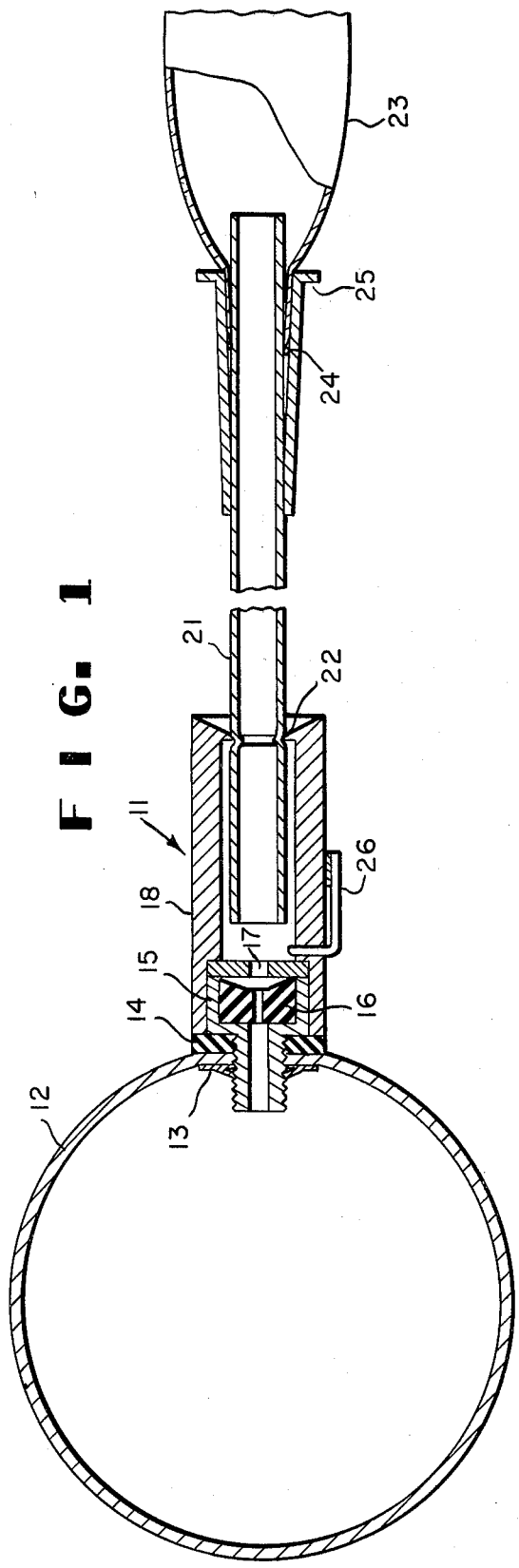
FIG. 1 is a cross-sectional view of the header, flow controller, feeder tube, connector and drip irrigation tube of the present invention.
Figure 3:
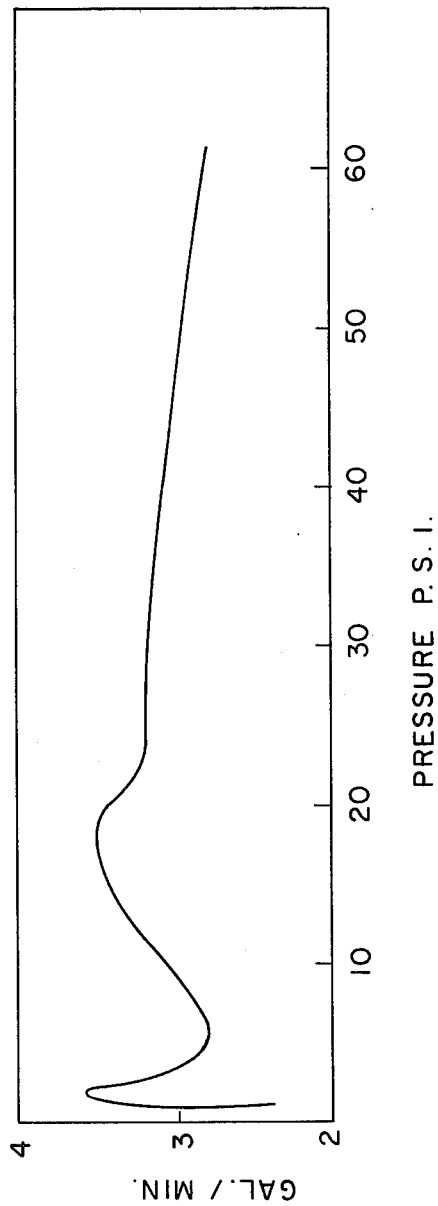
FIG. 3 is a graph showing the relationship between the flow of water in gallons per minutes and header pressure in psi for one of the flow controllers used in the present invention.
Figure 2:
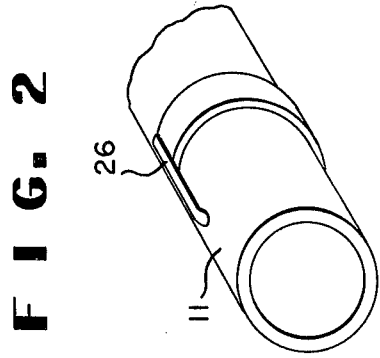
FIG. 2 is a perspective view of a section of the flow controller.

Obviously the capacity of the flow controller selected for use on a particular piece of drip irrigation tubing is determined by the length of the drip irrigation tubing and the number of gallons per minute per thousand feet of drip irrigation tubing. For instance the flow controller described in conjunction with FIG. 2 gives a flow of about 0.74 gallons per minute and would be suitable for use with about 200 ft of drip irrigation tubing where a flow rate of about 1.7 gallons per minute per thousand feet of drip irrigation tubing is desired. In practice a series of flow controllers having varying capacities are supplied to the farmers and the one having the capacity nearest that required to achieve the desired flow to a particular drip irrigation tube is selected and used.

The use of flow controllers as opposed to a conventional valve has the advantage that when one of the drip irrigation tubes breaks the flooding around the area of the break is much less severe. When using the conventional valve system to control individual drip irrigation tubes the flow at the break is generally about 15 times the flow rate for the piece of drip irrigation tubing involved, whereas with the present system using a flow controller the flow at the break is about that for the piece of drip irrigation tubing involved. Often the crop is covered with opaque plastic film and the flooding is not discovered until after the crops come up.

The use of flow controllers with drip irrigation systems makes balancing of the system much easier at start-up. Further the use of flow controllers avoids overflow during break-in of the non-woven plexifilamentary type of drip irrigation tubing, as well as readjustment of the individual valves after break-in of the drip irrigation tubes. Due to manufacturing variations one irrigation tube may supply the desired amount of water at say 5 psi while the next tube may supply the desired amount of water at 3 psi. Through the use of flow controllers this problem is overcome simply and automatically.

The use of flow controllers enables the use of smaller and longer water supply headers because pressure variation along the length of the water supply header is of less significance in the present system than when using conventional valves to control flow to the individual drip irrigation tubes. Further the need for valves on the water supply header on hills is substantially reduced or eliminated through the use of the present system.

The use of flow controllers to control the flow to individual drip irrigation tubes rather than conventional valves serves to make the flow rate essentially independent of:
1. Tubing quality/manufacturing variations
2. Tubing condition
3. Soil type - capillary action
4. Water quality
5. Lateral slope or undulation of the header
6. Temperature
7. Water pressure in the header
8. Header length variation off a main manifold.

What is claimed is:

1. A drip irrigation system comprising drip irrigation tubes connected to a water supply header by means comprising a flow controller capable of maintaining the flow of water therethrough within ± 15% of a predetermined value over a water pressure range of from 3 to 70 pounds per square inch within said water supply header.

2. The drip irrigation system of claim 1 wherein the predetermined capacity of the flow controllers is such that from about 1.5 to about 6 gallons per minute per thousand feet of drip irrigation tube is fed to said drip irrigation.

3. The drip irrigation system of claim 2 wherein the drip irrigation tube comprises a non-woven, spun bonded, plexifilamentary fabric.

* * * * *